May 6, 1958 A. T. DURLING 2,832,985
CLEANING APPARATUS FOR PHOTOGRAPHIC FILM NEGATIVES
Filed Sept. 10, 1954 2 Sheets-Sheet 1
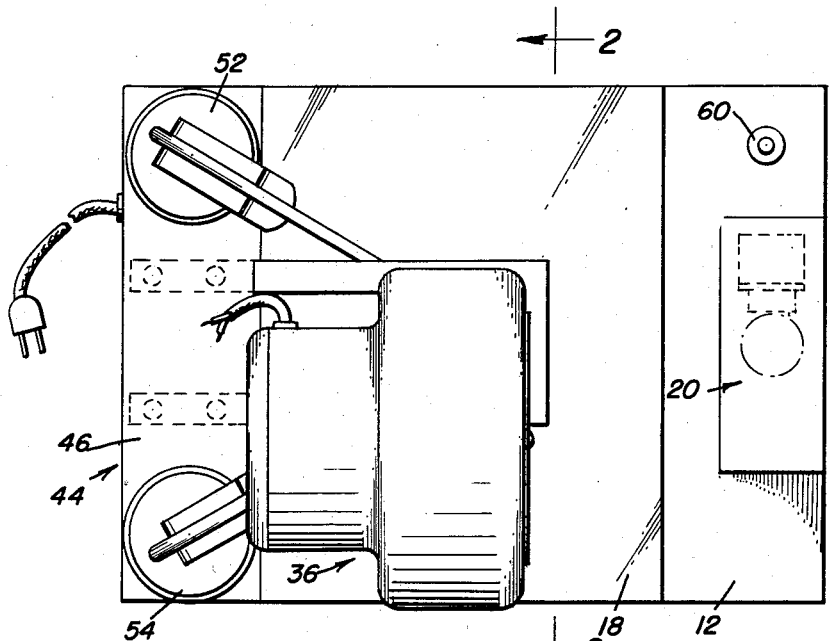
Fig.1
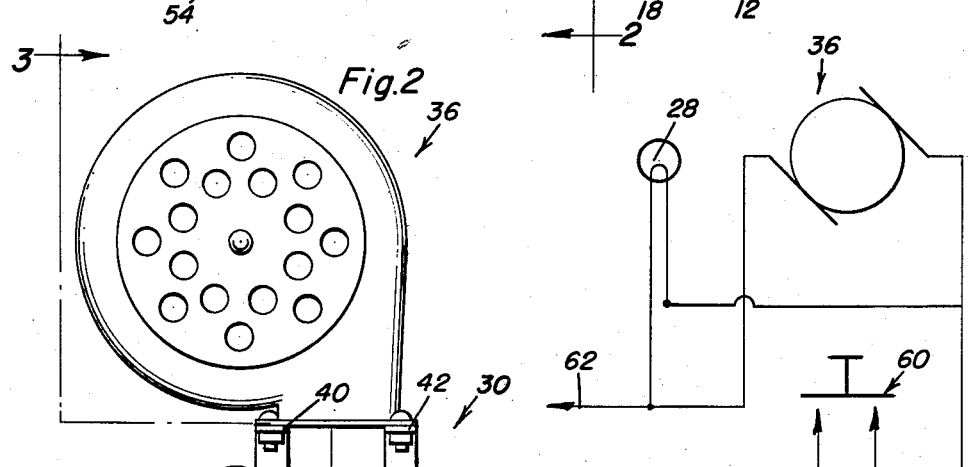
Fig.5
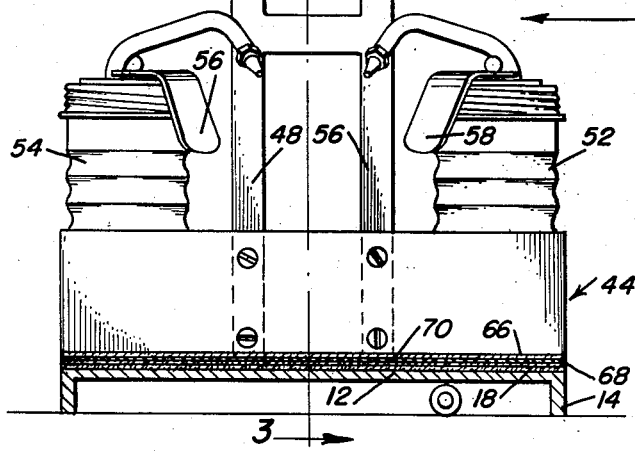
Albert T. Durling
INVENTOR.
BY *(signature)*
Attorneys May 6, 1958  A. T. DURLING  2,832,985
CLEANING APPARATUS FOR PHOTOGRAPHIC FILM NEGATIVES
Filed Sept. 10, 1954  2 Sheets-Sheet 2
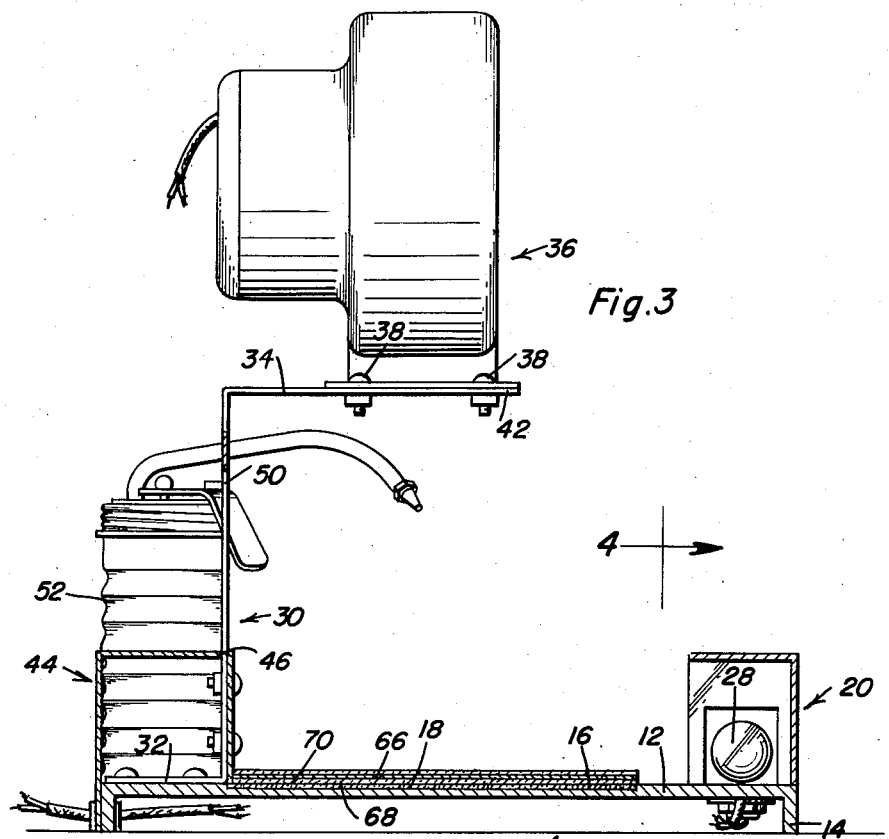
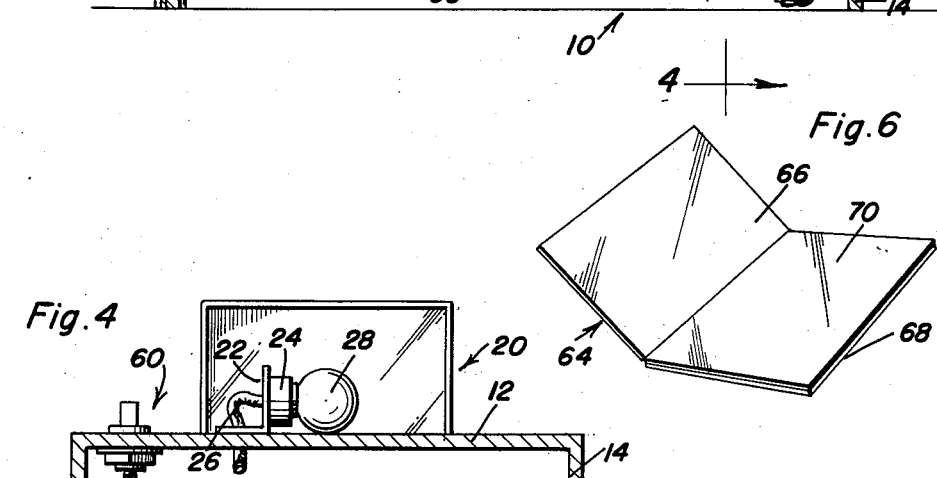
Albert T. Durling
INVENTOR.

United States Patent Office 2,832,985
Patented May 6, 1958

2,832,985

CLEANING APPARATUS FOR PHOTOGRAPHIC FILM NEGATIVES

Albert T. Durling, Hudson Falls, N. Y.

Application September 10, 1954, Serial No. 455,296

1 Claim. (Cl. 15—302)

This invention relates generally to photographic equipment, and pertains more particularly to a device particularly adapted for cleaning photographic film negatives prior to printing, enlarging or similar operations.

A primary object of this invention is to provide a compact and efficient unit and one in which a light source and a source of air current are so interrelated that the removal of foreign particles, such as dust and the like, from photographic film negatives is rendered extremely efficient.

Another object of this invention is to provide a cleaning device for photographic film negatives which embodies the use of a black mica supporting base upon which photographic film negatives are placed, a housing for directing light rays upon the photographic film negatives and a fan having an outlet directed vertically downwardly upon the photographic film negative so that dust and other foreign material may be readily and quickly observed such that a light motion with a brush or similar article will loosen the foreign material so that it may be blown away by the air current.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the improved cleaning assembly;

Figure 2 is a vertical section taken substantially along the plane of section line 2—2 in Figure 1;

Figure 3 is a vertical section taken substantially along the plane of section line 3—3 in Figure 2;

Figure 4 is a vertical section taken substantially along the plane of section line 4—4 in Figure 3;

Figure 5 is a diagrammatic showing of the circuit involved for the light source and fan; and Figure 6 is a perspective view showing the manner in which the photographic film negative is mounted in a glass holder device.

Referring now more particularly to the drawings, the reference numeral 10 indicates the base of the device generally, which will be seen to include a top portion 12 having peripheral depending flange portions 14 such that the top 12 is supported in spaced relation to the workbench, table or similar article upon which the assembly is placed. As will be seen most clearly from Figures 1 and 3, the top 12 is provided with a transverse groove 16 which extends between opposite sides thereof and inlaid within this groove is a sheet of black mica 18 which, it has been found, is most suitable for the purposes of carrying out the operation of this invention.

Secured to one side of the base is the housing which is indicated generally by the reference character 20 and which will be seen to consist of a generally rectangular opaque member which has all of its sides closed except the side facing the sheet of black mica 18 and which is closed at its bottom by the top 12. Mounted on the top 12 within the housing 20 is an L-shaped bracket member 22 upon which a socket member 24 is mounted. A pair of wires are disposed within the conductor 26 which issues from the socket 24 and a light bulb or any suitable source of light 28 is mounted within the socket such that the light emitting therefrom will be directed onto and across the sheet of mica 18.

On the opposite side of the sheet 18 is a generally Z-shaped bracket member 30 which has a lower horizontal arm portion 32 secured to the base 10 and an upper horizontal arm portion 34 which is disposed in spaced overlying relationship with the black mica sheet 18. A fan assembly, indicated generally by the reference character 36 is mounted upon the upper horizontal arm portion 34 of the Z-shaped bracket and is fastened thereto, as by suitable fasteners as the bolts 38 or the like. As will be seen most clearly in Figure 2, the upper horizontal arm portion 34 of the bracket 30 is formed of a pair of spaced leg members 40 and 42 such that the outlet of the fan assembly 36 will be free to pass therebetween directly downwardly upon the black mica sheet 18.

A receptacle retainer housing, indicated generally by the reference character 44 also forms part of the apparatus and this receptacle will be seen to consist of a generally oblong rectangular member which includes a top wall portion 46 provided with slots receiving the vertical leg portions 48 and 50 of the bracket 30 and with a pair of circular openings such that the conventional fluid pressure can members 52 and 54 may be placed therein. In this respect, it is to be noted that the members 52 and 54 may be permanently secured to the receptacle 44 or may be merely placed therein, as desired. These members are adapted to contain a supply of cleaning fluid, such as alcohol or other chemicals particularly adapted for use in cleaning photographic film negatives, and it will be readily apparent that their triggers 56 and 58 may be easily manipulated to direct the cleaning fluid upon the photographic film negative which is placed upon the black mica sheet 18.

A switch member of the push-button type, as indicated by the reference character 60, is mounted adjacent one corner of the device in place for easy manipulation by an operator, as desired. Referring most particularly to Figure 5, it will be seen that the light source 28 is connected in opposite sides of the circuit 62 of an electrical plug-in device for energizing the fan assembly 36 interposed in the circuit and that the switch 60 is interposed one side of the circuit so that the fan and light will operate only when the switch 60 is manually depressed.

In operation of the device, a negative holder, such as the type which is indicated generally by the reference character 64 in Figure 6, and which may consist of a pair of glass sheets hingedly secured together or merely disposed in relation such as to sandwich the film negative 70 therebetween, is placed upon the black mica sheet 18 in the manner shown in Figure 3. During the initial operation of cleaning, that is, when the photographic film negative is to be cleaned, the upper glass plate 66 is removed or hinged back, such as the case may be, and it will be apparent that the black mica sheet will absorb light and provide a dark background against which any particles of dust or foreign material may be readily observed upon the surface of the film negative with the aid of the light rays from the light source 28. The button switch 60 which simultaneously operates the light and the fan is depressed and the blower or fan started such that the air current will blow directly down upon the negative film with the result that the air pressure blows away any loose particles of dust or lint which may have accumulated on the film. An ordinary brush can be used to loosen any particles which may be able to resist the air pressure against them, or, if necessary, commerical liquid cleaning fluid or alcohol may be discharged from one of the receptacles 52 or 54 to facilitate the removal of smudges or the like which may have occurred on the film surface. Preferably, one of the receptacles 52 or 54 is filled with alcohol while the other is filled with a suitable commercial glass cleaner whereby when the top glass plate member 66 is placed upon the film negative, the glass may be easily and quickly cleaned.

It will be readily apparent that the precise positioning of the fan is such that the air pressure resulting therefrom will normally maintain the film negative directly upon the black mica sheet, as well as serving its purpose to prevent any particles of dust or dirt from adhering to the film.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A device for cleaning a photographic film negative comprising a platform having a groove therein, a sheet of dark light absorbing material in said groove providing a dark background against which to view particles of dust on a film negative positioned over said sheet, an electric light bulb on said platform above and at one side of said sheet, a light reflecting housing rising from said platform over said bulb and deflecting light rays from said bulb across a film negative positioned over said sheet, a bracket rising from the platform at the other side of the sheet, a downwardly discharging electric blower on said bracket overhanging said sheet for cleaning dust off a film negative, and electric means including a single switch for simultaneously energizing said light bulb and blower.

References Cited in the file of this patent

UNITED STATES PATENTS

| | | |
|---|---|---|
| 746,618 | White | Dec. 8, 1903 |
| 1,575,346 | Lohn | Mar. 2, 1926 |
| 2,059,197 | Backer et al. | Nov. 3, 1936 |
| 2,099,012 | Goodrich et al. | Nov. 16, 1937 |
| 2,127,477 | Carpenter et al. | Aug. 16, 1938 |
| 2,247,211 | Solk | June 24, 1941 |
| 2,257,836 | Brown | Oct. 7, 1941 |
| 2,408,438 | Mills | Oct. 1, 1946 |

FOREIGN PATENTS

| | | |
|---|---|---|
| 600,236 | Great Britain | Apr. 2, 1948 |